United States Patent [19]

Clare et al.

[11] Patent Number: 4,853,244

[45] Date of Patent: Aug. 1, 1989

[54] METHOD OF PREPARING A GELLED OMELETTE MIX AND THE PRODUCT PRODUCED THEREBY

[75] Inventors: Kenneth Clare, Vista, Calif.; James H. McMullen, Hersham, United Kingdom; Medeana Findlay, Lewes, United Kingdom; Susan E. Gaisford, Bletchingley, United Kingdom

[73] Assignee: Kelco International Limited, London, United Kingdom

[21] Appl. No.: 61,852

[22] Filed: Jun. 11, 1987

[30] Foreign Application Priority Data

Jun. 17, 1986 [GB] United Kingdom ............... 8614684

[51] Int. Cl.⁴ ................................................. A23L 1/32
[52] U.S. Cl. .................................... 426/573; 426/524; 426/614
[58] Field of Search ............... 426/614, 568, 573, 512, 426/524

[56] References Cited

U.S. PATENT DOCUMENTS

| | | | |
|---|---|---|---|
| 3,383,221 | 5/1968 | Chin et al. | 426/614 |
| 3,565,638 | 2/1971 | Ziegler et al. | 426/614 |
| 3,769,404 | 10/1973 | Latham et al. | 426/614 |
| 3,911,144 | 10/1975 | Strong et al. | 426/588 |
| 3,958,035 | 5/1976 | Stearns et al. | 426/614 |
| 4,120,986 | 10/1978 | Lynn | 426/549 |
| 4,296,134 | 10/1981 | Boldt | 426/250 |
| 4,425,367 | 1/1984 | Berkowitz et al. | 426/89 |

FOREIGN PATENT DOCUMENTS

| | | |
|---|---|---|
| 0009897 | 4/1980 | European Pat. Off. . |
| 0103427 | 3/1984 | European Pat. Off. . |
| 013425 | 5/1970 | Japan . |
| 57-118767 | 7/1982 | Japan . |
| 57-122768 | 7/1982 | Japan . |

OTHER PUBLICATIONS

O'Brien et al., J. of Food Sci., 47, 412–417, 1982.

*Primary Examiner*—Donald E. Czaja
*Assistant Examiner*—Celine T. Callahan
*Attorney, Agent, or Firm*—Gabriel Lopez; Hesna J. Pfeiffer

[57] ABSTRACT

An omelette mix is prepared from a liquid egg product, which may be, for example, whole egg, egg white, egg yolk, a de-cholesterized or artificial mix, or any combination of two or more of the foregoing, by adjusting its pH, preferably with citric acid, then adding to it a hydrocolloid, comprising an alginate, adding a multivalent metal salt of only low solubility in water, e.g. calcium sulphate dihydrate, in order to facilitate any required cross-linking of the hydrocolloid molecular chains, mixing thoroughly to form a homogeneous material, forming this material into any desired shape and freezing or chilling it to produce a stable intermediate material that can readily be quickly heated to give an omelette in form ready for consumption. In general sodium chloride will be introduced into the mix, conveniently with the hydrocolloid, in order to enhance the flavor of the omelette. A sequestrant is desirably added to control the release of the multivalent metal salt and thus regulate the speed of the cross-linking reaction.

14 Claims, No Drawings

METHOD OF PREPARING A GELLED OMELETTE MIX AND THE PRODUCT PRODUCED THEREBY

This invention relates to eggs and to omelettes made from them. The conventional method of preparing omelettes involves breaking fresh eggs, whisking the whites and yolks together, adding seasoning and possibly other contents, and heating with fat in a pan. The omelette is then eaten straight away. For production of omelettes on a large scale, e.g. in canteens of schools, hospitals and factories, or in commercial catering establishments, the conventional method involves too much time and labour. However, pre-preparation of omelettes, followed by keeping them hot or allowing them to cool to room temperature and reheating them, causes deterioration of their flavour and texture.

With the advent of freezer technology, it has been suggested that an omelette could be frozen after cooking, and then reheated just before it is eaten. The resulting products are however rubbery in texture and much syneresis takes place. Various proposals have been made to overcome this problem and the addition to the whole egg mix, prior to cooking and freezing, of such materials as starches of different types, xanthan gum, karaya gum and carboxymethyl cellulose has been tried. Some improvement has resulted from these attempts but the principal disadvantage is denaturing of the egg protein during cooking, the resulting impairment of its water holding capacity during chilling or freezing giving syneresis and a rubbery texture. A second disadvantage is that the product has to be heated twice, firstly in cooking and secondly in the re-heating for consumption.

U.S. Pat. No. 3,565,638 discloses a frozen egg mix that is said to be free from syneresis and that does not change colour after thawing and cooking. In this mix, milk solids and an edible starch are added to decrease syneresis, and a vegetable gum is added to increase viscosity.

This U.S. Pat. No. 3,565,638 nowhere suggests that a vegetable gum can in itself decrease syneresis and improve the texture of the resulting mix, when cooked, and moreover it is not suitable for dishes in which eggs are used without milky or starchy additives. Moreover, it discloses only the use of whole eggs.

In accordance with the present invention, an omelette mix is prepared from a liquid egg product, which may be, for example, whole egg, egg white, egg yolks, a de-cholesterized or artificial mix, or any combination of two or more of the foregoing, by adjusting its pH, preferably with citric acid, to be in the range 6.3 to 7.1, then adding to it a hydrocolloid comprising an alginate and optionally a non-gelling gum such as xanthan gum, if necessary adding a multivalent metal salt of only low solubility in water in order to facilitate any required cross-linking of the hydrocolloid molecular chains, mixing thoroughly to form a homogeneous material, forming this material into any desired shape and freezing or chilling it to produce a stable intermediate material that can readily be quickly heated to give an omelette in form ready for consumption. In general sodium chloride will be introduced into the mix, conveniently with the hydrocolloid, in order to enhance the flavour of the omelette. A frozen material will have a shelf life of at least one month, a chilled material (i.e. one at about 4° C.) a shelf life of about 72 hours maximum.

If whole eggs are used in the foregoing method, it is preferred that they be pasteurized, i.e. heat-processed to eliminate pathogens. The eggs vary in pH but this is adjusted readily. Calcium content may be another important variable in the egg raw material. This calcium variability can be accommodated by formulation adjustment. The pH is preferably in the range 6.6 to 6.8. The colour of eggs deteriorates after cooking if the pH is higher than 7.1.

A frozen material can be cooked without being first defrosted either in an oven or, preferably, in a pan or on a griddle. A convection oven gives better results than a microwave oven. A chilled material may also be cooked in a pan or an oven.

In a first preferred embodiment of the present invention, the hydrocolloid used is an alginate, preferably sodium alginate, e.g. that sold under the registered Trade Mark "Manugel DM". A solution of citric acid is added to the liquid egg product in order to adjust its pH to within the range 6.3 to 7.1, preferably 6.6 to 6.8. Other food acids can be used, but citric acid is preferred. Dissolving powdered citric acid in the liquid egg product is a less suitable procedure. A dry mix of the alginate and sodium chloride is dissolved in water (or alternatively sodium chloride is added to an aqueous solution of the alginate), the liquid egg containing citric acid is added together with an aqueous slurry of a low-solubility calcium salt, e.g. calcium sulphate dihydrate, and a sequestrant, and thorough mixing is carried out to form an egg omelette gel. This may then be divided into portions of a desired size suitable for serving, which can be frozen or chilled into any suitable shape—either a conventional folded omelette, a simple geometrical shape such as a cylinder or cuboid, or a novelty shape such as a chicken or a popular character from a children's book. Freezing is not necessary for shaping the gel obtained, but it is possible to extrude the chilled gel into sachets to form an easily dispensed material. Both these methods allow precise control of portion size.

The calcium sulphate dihydrate is added to cross-link the alginate molecules to form the gel. A salt of any multivalent metal that has an insoluble alginate would be chemically suitable, but magnesium alginate is too soluble and other metals are poisonous, so that only calcium is sufficiently non-toxic to be allowed in a food product. Calcium sulphate dihydrate is preferred because of its low solubility in water—too high a calcium concentration, which would result from using a soluble salt such as calcium chloride, would cause the gelling to take place too quickly and unevenly. Calcium phosphate could be used but for economic reasons it is not preferred. Some eggs contain sufficient calcium to make extraneously added calcium unnecessary: some eggs even contain too much calcium to allow gelling at a reasonably slow speed—ten minutes is the normal time. It is therefore necessary to test the calcium content if alginate is to be used, unless a sequestrant is added. The effect of the sequestrant, which may be, for example, a soluble phosphate (usually of sodium) such as acid sodium pyrophosphate, is to regulate the cross-linking of the alginate molecules by temporarily blocking the effect of the calcium and allowing its slow release, thus controlling the gelation time and preventing uneven gelling. The sequestrant allows the addition of excess of calcium in the form of calcium sulphate dihydrate, thus inhibiting the effect on gelling of variability in the amount of calcium contained in the egg.

When a sequestrant is used, it is preferably added to the liquid egg product before the calcium salt. If the sequestrant is dissolved in the egg before the alginate solution is added, the other ingredients can be added in any order. The calcium salt must not be added to the egg before the sequestrant.

The addition of another non-gelling gum, e.g. xanthan gum, to the alginate gelled product reduces the possibility of syneresis in the cooked product. This procedure will also allow uniform suspension of the low solubility Ca salt which facilitates even gelation. The use of alginate results in formation of a gel, which can be handled more easily and retains its shape even on cooking, so that if chilled, it can still be provided in a shaped form and, even if frozen, it does not lose its shape on thawing and cooking.

This leads to a second and particularly preferred embodiment of the invention, in which both xanthan gum and alginate are used. In this case, the xanthan gum and alginate are made into an aqueous sodium-chloride-containing solution, e.g. by dissolving a dry mix of all three ingredients. The liquid egg containing citric acid is then added to this mixture. A sequestrant is preferably added to the liquid egg containing the citric acid. If the sequestrant is in solution, it is preferably added before the aqueous slurry of calcium sulphate dihydrate, but can be added at the same time as the slurry. If the sequestrant is not in solution, it must be added before the slurry. An egg omelette gel is formed, as with alginate on its own.

The preferred method of cooking the compositions is by pan or griddle frying. However the shape retention properties of the composition are also suitable for such methods as oven baking and microwaving.

Tests on these preferred embodiments by panels of tasters indicate that the texture of the resulting omelettes is improved compared with omelettes made from identical mixes but with the xanthan gum and alginate omitted. The appearance of oven-baked omelettes is improved by spraying them after freezing with corn oil and dextrose solution.

The amounts of the various materials used in the preferred processes of the invention, based on 100 g of liquid egg, are as follows, the amounts of alginate being applicable whether or not it is used with xanthan gum:

Xanthan, 0.01 to 1.0 g, preferably about 0.15 g
Alginate, 0.1 to 1.0 g, preferably about 0.5 g
Calcium sulphate dihydrate, 0.01 to 0.5 g, preferably about 0.34 g
Sequestrant acid solution pyrophosphate range 0.01 to 1 g, preferably about 0.2 g.

Insufficient sequestrant causes presetting; too much sequestrant means that the gel will not set at all.

If citric acid is not added (and attempts at pH control by methods other than addition of acid present difficulties) the cooked product has a green or grey colour, which is unacceptable. However, if the pH is below 6.3, alginates produce dry and pasty omelettes.

Other hydrocolloids that can give reasonable omelettes in admixture with alginate include starch, guar gum, guar/xanthan mixtures, and carboxymethylcellulose.

The following examples, which include comparative data, illustrate the invention.

Experiments were carried out using liquid pasteurized whole egg, since the use of unpasteurized egg gave less reproducible results.

In all experiments, unless otherwise stated, the alginate and xanthan gum were those sold under the registered trade marks "Manugel DM" and "Keltrol F" respectively; the calcium sulphate was the dihydrate sold as Ground Gypsum Superfine White by British Gypsum; the amount of egg used was 115 g, which corresponds to two average-sized eggs; 0.6 g of salt (sodium chloride) was added to improve flavour. These amounts are suitable for one omelette.

EXAMPLES A-1 TO A-6

The gums mentioned in Table A below for each part of the example were dry-mixed with the sodium chloride and dissolved in most of the water in a Citenco stirrer. Meanwhile, the citric acid was dissolved in the egg. The gum solution and egg were then mixed in the stirrer, avoiding excessive aeration. The calcium sulphate dihydrate was slurried in the remaining water and added to the mix, which was stirred for a further 30 seconds or so and poured into greased foil dishes. The mixes were frozen overnight and then cooked in a rotary oven at 190°–195° C. for 30 minutes, with the dishes uncovered during cooking.

TABLE A

|  | 1 | 2 | 3 | 4 | 5 | 6 |
| --- | --- | --- | --- | --- | --- | --- |
| Alginate | 0.9 | 0.9 | 0.9 | 0.9 | — | 0.9 |
| Calcium Sulphate | 0.06 | 0.06 | 0.04 | 0.04 | — | — |
| Xanthan gum | — | — | — | 0.18 | — | — |
| Instant textaid A* | — | 1.75 | — | — | — | — |

*Instant tapioca starch

The results were as follows:
1. Slight skin, slightly browned top, scrambled egg taste and texture
2. Very tough skin, good taste and texture beneath this.
3. Tough skin, scrambled egg taste, slightly gelled texture
4. Similar to 3 but slightly more volume
5. Tough skin, custard/scrambled egg taste and texture, good colour
6. Tough skin, custard (gelled) texture The experiments were repeated with the dishes covered with foil. The resulting omelettes were pale in colour with tough skins and similar textures to those in A-1 to A-6.

EXAMPLES B-1 TO B-3

The following mixtures were prepared as in Examples A-1 to A-6, using 0.9 g of alginate and 0.04 g of calcium sulphate dihydrate. The initial pH of the eggs was 7.8. In addition, the following amounts of xanthan gum were added: B-1: 0.18 g; B-2: 0.27 g; B-3: none.

The omelettes gelled after 10–15 minutes, and were either frozen or chilled overnight. They were then cooked in a non-stick frying pan greased with margarine on an electric ring at temperature setting 4. The omelettes were turned half way through cooking time.

RESULTS

Cooked from chilled

1 & 2. Both good texture and volume + colour. Slight toughness of skin (Slightly too gelled), omelettes good to handle during cooking
3. Pale with egg-custard texture Cooked from frozen Reasonable taste and texture.

EXAMPLES C-1 TO C-2

The following mixtures were prepared as in Examples A-1 to A-6.

|  | 1 | 2 |
|---|---|---|
| Calcium sulphate | 0.02 | 0.04 |
| Alginate | 0.50 | 0.90 |
| Microcrystalline cellulose | — | 1.75 |
| Xanthan gum | 0.18 | — |

The products gelled and were refrigerated overnight. They were then cooked in a frying pan on an electric plate set at 4. The omelette was turned during cooking.

The flavour was very good in both cases. C-1 was easy to handle, but C-2 cracked slightly.

EXAMPLES D-1 TO D-4

The mixes in Table D were frozen overnight, taken from the freezer, sprayed with corn oil and cooked uncovered in an oven at 190° C. for about 30 minutes.

TABLE D

|  | 1 | 2 | 3 | 4 |
|---|---|---|---|---|
| Alginate | 0.5 | 0.5 | 0.5 | 0.5 |
| Calcium sulphate | — | 0.02 | 0.02 | 0.02 |
| Xanthan gum | 0.18 | 0.18 | — | — |
| Maltodextrin MD25 | — | — | 8.75 | 4.4 |

The results were as follows:

D-1 and D-2 were of good flavour, satisfactory appearance and good texture.

D-3 and D-4 were of satisfactory appearance but both rather wet. They had a slightly aerated texture.

EXAMPLES E-1 TO E-8

A fresh batch of pasteurized egg was used. The initial pH of the egg was 7.3, compared with 7.8 in Examples B-1 to B-3. Mixtures were then prepared as in Examples A-1 to A-6. The citric acid was omitted in E-1 for comparison, and 0.10 g of citric acid was used in all the other formulations.

|  | 1 | 2A & B | 3A & B | 4 | 5 | 6 | 7A & B | 8 |
|---|---|---|---|---|---|---|---|---|
| Alginate | — | — | — | 0.50 | 0.50 | — | 0.50 | 0.50 |
| Corn oil | — | — | 1.0 | — | — | 1.0 | 1.0 | — |
| Calcium sulphate | — | — | — | — | 0.02 | — | — | 0.02 |
| Xanthan gum | — | — | — | — | — | 0.18 | 0.18 | 0.18 |

E-1, E 2A, E-3A, E-6 and E-7A were frozen raw and then cooked at 190° C. in an oven.

E-2B, E-4, E-5 and E-7B were chilled and then fried.

E-3B was fried, frozen and reheated in an oven.

E-8 was cooked, fried from frozen.

RESULTS 1. (No citric acid) unsatisfactory, grey/green colour, fried-egg type of texture.

2A. Improved texture and colour.

2B. Good taste and texture.

3A. Similar to 2, slightly better appearance (browned evenly on top).

3B. Unacceptable when reheated—rubbery texture—dry.

4 & 5. Very similar, good to handle, good taste and texture.

6. Similar to 3, no detectable improvement.

7A & 7B. Similar to 3, no detectable improvement.

8. Good to handle, good taste and texture.

Using another fresh batch of egg, Examples E-1, E-2A, E-3A, and E-6 were repeated, and Examples E-4 and E-5 were repeated with inclusion of 1.0 g corn oil in the formulation. The results after freezing raw and baking at 190° C. in an oven were as follows:

1. (No citric acid) grey base, fried egg taste+texture.

2A. Good colour, but fried egg taste and texture.

3A. Similar to 2A.

4+corn oil. Better texture than 2A, good flavour.

5+corn oil. Very good taste and texture.

6. Slightly more pasty texture.

In these Experiments, good results were obtained without addition of a hydrocolloid, although gelling was not obtained without alginate plus calcium sulphate dihydrate. However, not all eggs give good results in the absence of a hydrocolloid, and addition of a hydrocolloid, particularly xanthan or alginate, enables frozen and chilled eggs to consistently give acceptable omelettes on re-heating.

EXAMPLE F

Novel shape omelettes for chilled cabinet

Omelette mixes containing 0.5 g and 0.9 alginate, 115 g egg, 0.6 g salt, 0.1 g citric acid, and water to 175 g were poured into moulds of various shapes and sizes, e.g. small square and small round moulds. After 18 hours' refrigeration the shapes were fried. Results were very good in taste and texture, and the shapes were retained. Both levels of alginate were satisfactory, although those containing 0.9 g were easier to handle quickly than those containing 0.5 g.

EXAMPLE G

Samples were prepared as in Example F but were frozen. The products were then fried directly from the deep freeze. The shape was retained and the products were good in taste and texture.

EXAMPLES H-1 TO H-7

A series of seven experiments was carried out on each of two fresh batches of egg, both of which had an initial pH of 7.3. In each experiment 115 g of liquid egg, 0.9 of Manucol DM, 0.18 g of citric acid, 0.6 g of sodium chloride and water to 175 g was used. The weights in grams of the other ingredients were as follows:

|  | 1 | 2 | 3 | 4 | 5 | 6 | 7 |
|---|---|---|---|---|---|---|---|
| Xanthan gum | — | — | — | 0.17 | 0.17 | 0.17 | 0.17 |
| Acid sodium pyrophosphate | 0.3 | — | 0.6 | 0.3 | — | 0.6 | — |
| Calcium sulphate dihydrate | 0.34 | 0.34 | 0.34 | 0.34 | 0.34 | 0.34 | — |

The gums were dry mixed with the sodium chloride and dissolved in most of the water using a Citenco stirrer. Meanwhile, the sequestrant, calcium sulphate dihydrate and citric acid solution were mixed into the liquid egg. The gum solution was then added to the liquid egg containing citric acid solution, sequestrant and calcium sulphate dihydrate and mixed for 15 seconds using a Citenco stirrer. The mix was then poured into foil dishes, frozen overnight, and then cooked in a frying pan over low heat for 10 minutes.

RESULTS

First Batch

1a Began to gel after 8 minutes. Shape retained on cooking, taste and texture good.

2a Product thickened and began to gel during mixing. Product split into two layers when cooked.

3a Gelation time 1½ hours. Spread a little on cooking.

4a Gel forming after 10 minutes. Shape retained on cooking, taste and texture good.

5a Thickening and lumpy as mixed, viscosity very high compared with F4. Retained shape on cooking.

6a Slow set—weak gel after 90 minutes—lost shape during cooking.

7a Thickened during mixing, soft gel formed after 30 minutes. Retained shape during cooking.

Second Batch

1b Began to gel after 8 minutes. Shape held during cooking, satisfactory taste and texture.

2b Thickening and gelling during mixing, difficult to dispense—firm gel formed within 2 minutes. Shape retained during cooking.

3b Gelation time 90 minutes. Some spreading around edges when cooked.

4b Smooth mix formed. Gelation time 8 minutes. Excellent cooked product.

5b Thickening and gelling during mixing. Cooked product has rough pasty texture, probably due to shearing the gel during formation.

6b Slow set, weak gel forming after 1 hour. Structure collapsed during cooking.

7b Thickening during mixing giving rough texture. Soft gel formed after 20 minutes. Shape retained on cooking.

EXAMPLE I

An egg product was prepared by dissolving a dry mix of Manucol JKT (3.3 g) and sodium chloride (1.0 g) in 200 g of pasteurised whole egg to which citric acid had been added to adjust the pH to 6.8. A slurry of 2.0 g of calcium sulphate dihydrate in 6.0 g of water was then added with thorough mixing. The product was dispensed into foil dishes and allowed to gel (10-15 minutes) before freezing. The products were cooked from frozen in a frying pan over low heat (10 minutes). The products retained their shape during cooking, they had acceptable an appearance but were firmer in texture than the type of product prepared in Example H.

We claim:

1. A method of preparing gelled omelette mix from a liquid egg product, comprising adjusting the pH of a liquid egg product to be in the range 6.3 to 7.1, mixing it with 0.1 to 1.0% alginate, throughly mixing the ingredients with further addition of an aqueous slurry of 0.01 to 0.5% of a calcium salt in order to form a homogenous material and facilitate any required cross-linking of the alginate molecular chains to form a gel, forming this material into any desired shape and freezing or chilling it to produce a stable intermediate material that can readily be quickly heated to give an omelette in a form ready for consumption.

2. A method of claim 1 in which the alginate is sodium alginate.

3. A method of claim 1 in which a sequestrant is added to the liquid egg product after its pH has been adjusted but before the calcium salt is added.

4. A method of claim 1 in which a sequestrant is dissolved in the liquid egg product before addition of the alginate.

5. A method of claim 1 in which the calcium salt is added to the liquid egg product before the alginate.

6. A method of claim 1 in which the salt is calcium sulphate dihydrate.

7. A method of claim 1 in which the resulting gelled egg product is in portions suitable for serving and of any desired shape, division into such portions taking place either before gelling or after freezing the product for storage.

8. A method of claim 1 in which the pH of the liquid egg product is adjusted to be in the range 6.6 to 6.8.

9. A method of claim 1 in which sodium chloride is added to the mix.

10. A method of claim 9 in which the sodium chloride is added with the alginate.

11. A method of claim 1 in which the pH adjustment is carried out using citric acid.

12. A method of claim 11 in which the citric acid is added as an aqueous solution to the liquid egg.

13. A method of claim 1 in which the liquid egg product is pasteurized whole egg.

14. A gelled omelette mix prepared by the process of claim 1.

* * * * *